Sept. 23, 1958 O. K. NILSSEN 2,853,614

FREQUENCY DRIFT COMPENSATION

Filed Jan. 31, 1957

INVENTOR.
OLE K. NILSSEN
BY
Charles H. Brown
ATTORNEY

United States Patent Office 2,853,614

Patented Sept. 23, 1958

2,853,614

FREQUENCY DRIFT COMPENSATION

Ole K. Nilssen, Inkster, Mich., assignor to Radio Corporation of America, a corporation of Delaware Application January 31, 1957, Serial No. 637,490

14 Claims. (Cl. 250—36)

This application relates broadly to frequency drift compensation circuits, and particularly to an oscillator frequency drift compensation arrangement employing elements possessing a large negative temperature coefficient of resistance.

Frequency stability in apparatus operating at very high frequencies (V. H. F.) and ultra high frequencies (U. H. F.) is critical. Many oscillators which employ electron discharge devices and operate in these frequency ranges have a tendency to drift from their initially-set operating frequency, a rather appreciable period of time elapsing before a stable condition is reached. Investigation has shown that oscillator drift during the warm-up period is largely due to heat flow, both inside as well as outside the oscillator electron discharge device or tube. The oscillator drift may be considered to undergo two transistory phases until stability is achieved. The initial phase, which accounts for most of the drift in frequency during a relatively short period of time, is due to physical changes within the tube produced by the heat. The second phase, which accounts for a lesser part of the frequency drift spread over a much larger time period, is due to the changes taking place in the associated oscillatory tank circuit elements. The heat flow within the tube raises the temperature of the elements therein, changing their configuration and geometry which leads to changes of grid-to-plate, grid-to-cathode, and other interelectrode capacitances. It has been found that these tube capacitances exhibit a positive temperature coefficient. The generated heat increases the interelectrode capacitances, thereby decreasing the oscillation frequency. It has also been found that the heat conducted from the tube by the oscillatory tank circuit inductance and changes in the ambient temperature are key factors in the long-term or second phase of frequency drift.

Metals commonly used in oscillator tank circuits possess a positive coefficient of expansion and thus an increase in temperature results in an increase in length, hence an increase in inductance. The change of inductance has been found to be directly proportional to the average temperature rise. Additionally, in V. H. F. and U. H. F. oscillators the circuit inductance usually consists of a metallic conductor of various dimensions and shapes, possessing a high thermal conductivity. The conductor is terminated by a capacitor serving a dual purpose of partial frequency determination and compensation. In such circuits the circuit inductance becomes the medium of heat conductivity between the tube and the tank circuit capacitance. The physical characteristics of this conduction medium are important factors affecting the oscillator frequency characteristics if a temperature-sensitive circuit capacitance is used. A complete analysis of the frequency characteristics of oscillators under conditions of heat flow is presented in an article entitled "Frequency characteristics of local oscillators" by W. Y. Pan, beginning on page 379 of the September 1955 issue of the RCA Review, volume XVI, No. 3, published by RCA Laboratories, Radio Corporation of America.

The instant invention proposes an arrangement for causing an oscillator to exhibit a positive frequency drift characteristic of such an amount and nature as to compensate for or neutralize both the short-time and long-time negative frequency drift characteristics resulting from the heat flow factors previously discussed. The significant element of the arrangement proposed is a thermistor, a thermally sensitive resistor possessing a large negative temperature coefficient of resistance.

It therefore is an object of this invention to provide a novel means for stabilizing the frequency of an oscillator.

Another object of this invention is to provide a novel means for automatically compensating for oscillator frequency drift.

Still another object of this invention is to maintain the operating frequency of an oscillator constant over wide variations in component and ambient operating temperatures.

Yet another object of this invention is to maintain the operating frequency of an electron discharge device or vacuum tube circuit at its initial value over an extended period of time.

In one aspect, the invention comprises the novel arrangement of a thermistor in the circuit supplying voltage to the plate electrode of the oscillator tube so mounted as to compensate for long and short time frequency drift. As the initial operating temperatures within the oscillator tube cause rapid changes in the interelectrode capacity, hence realization of a negative frequency drift characteristic, a correspondingly rapid heat generation from a primary heat source raises the temperature of the thermistor, the resistance of which decreases with the temperature rise. A decrease of resistance of the thermistor, which is serially connected in the plate voltage supply circuit, lessens the voltage drop across the thermistor, raising the potential, at the oscillator tube plate electrode. Inasmuch as an oscillator exhibits a change in frequency depending upon the plate voltage, the increase in plate potential offsets the negative frequency drift characteristic caused by heat generation within the tube. The thermistor is also arranged in the circuit in a novel manner so as to be responsive to heat radiated from a second source which follows the long-time temperature characteristic of the circuit. The additional long-time increase in temperature, which lowers the oscillator frequency as a result of changes in oscillatory tank circuit elements, will likewise decrease the resistance of the thermistor and raise the plate electrode potential. With selection of a proper thermistor this raises the oscillator frequency a sufficient amount to offset the heat-produced negative frequency drift. It is proposed that the primary heat source comprise a resistance inserted in the anode electrode supply lead which will experience a rise in temperature as a result of current flow therethrough. The secondary heat source may be the inductance of the tank circuit, which will follow the long-time temperature characteristic of the circuit. In the manner thus decribed it is possible to obtain with one compensating element complete frequency stabilization of an oscillator, frequency drift compensation being introduced for both long-time and short-time variations in oscillator frequency due to the influence of heat.

These and other objects, aspects, features and advantages of the invention will be apparent to those skilled in the art from the following more detailed description taken in conjunction with the appended drawing, wherein.

Figures 1, 2, 3, 4:
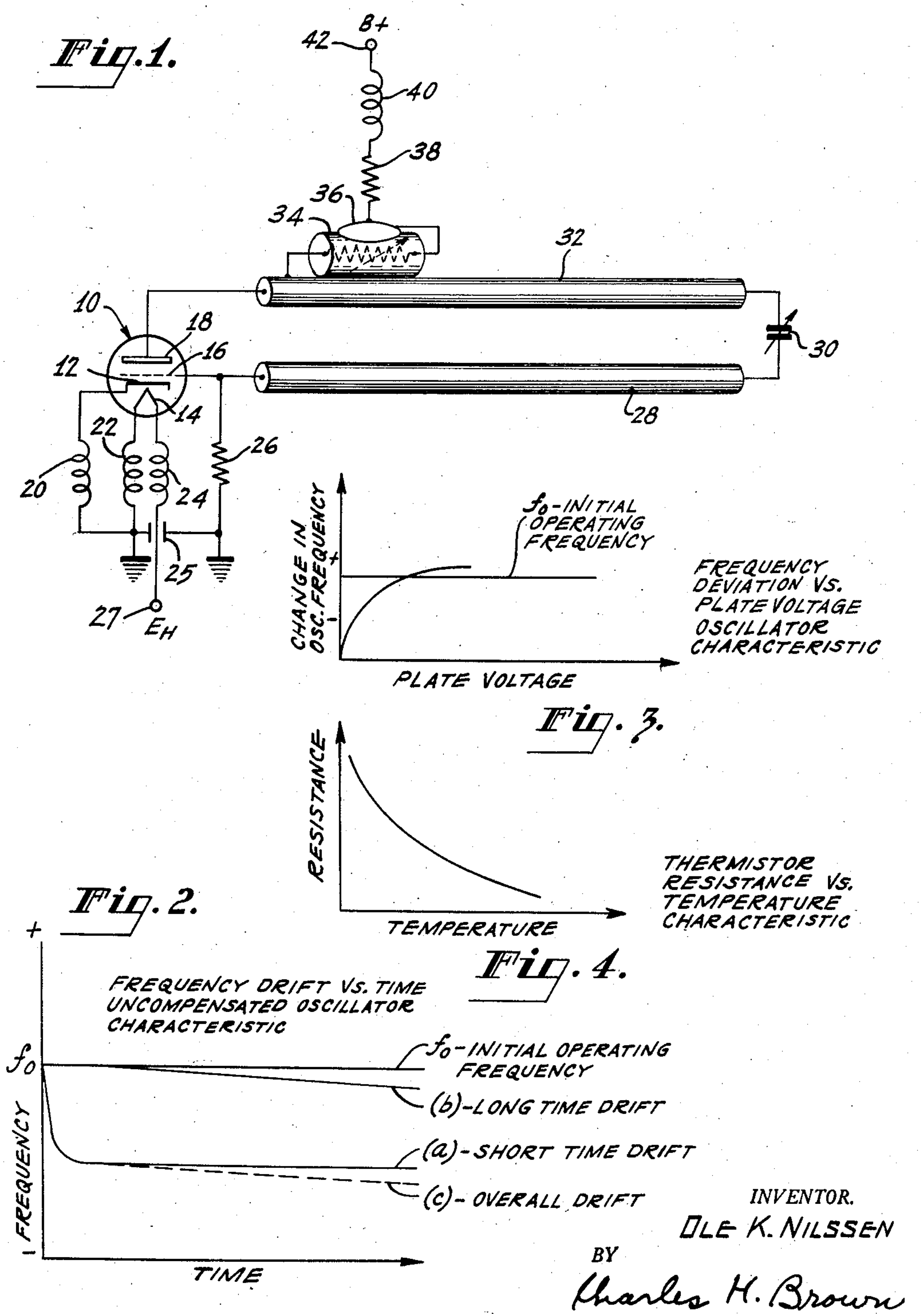
Figure 1 is a combination electrical schematic diagram of an oscillator employing a thermistor element so mounted as to effect frequency drift compensation over a wide range of operating temperatures.
Figure 2 shows a series of curves illustrating the long-time, short-time, and overall frequency drift characteristics of an uncompensated oscillator due to temperature changes with respect to time.
Figure 3 shows a curve indicating the frequency deviation characteristic of an oscillator with respect to changes in anode voltage.

Figure 4 graphically illustrates the negative temperature coefficient of resistance of typical thermistors;

Reference is made to Figure 1, illustrating an ultra high frequency (U. H. F.) triode oscillator employing the frequency drift compensation arrangement of this invention. Such an oscillator may be utilized as the local oscillator in frequency modulation (F. M.) and television (TV) tuners operating in the V. H. F.-U. H. F. portion of the frequency spectrum. An electron discharge device 10 such as a vacuum tube is used, having a plate electrode 18, a control grid 16, and a cathode 12. Since this triode is of the indirectly-heated type, the heater element 14 is also shown. The cathode 12 is connected to a point of reference potential, or ground, thru a radio frequency choke coil 20 the function of which is to prevent the circulation of radio frequency currents in this cathode circuit. The heater voltage supply (not shown), one terminal of which is grounded, is connected to the heater voltage terminal 27 and the heater circuit is completed thru a ground connection. Radio frequency choke coils 22, 24 are inserted in the heater circuit to allow the passage of direct current from the heater supply but prevent the circulation of radio frequency energy. A feed-through capacitor 25 serves to by-pass to ground any radio frequency energy appearing in the heater circuit. The grid electrode 16 is connected to ground thru a direct current or D. C. grid-return resistance 26 serving as a grid-biasing means. An oscillatory tank circuit comprises two parallel inductors 32, 28 forming a modified transmission line type tank. The plate 18 is connected to one end of conductor 32, while the grid 16 is connected to the corresponding end of conductor 28. The other ends of inductors 32, 28 are connected to opposite sides of a variable capacitor 30. The potential on the plate or anode electrode 18 is applied from the positive terminal 42 (B+) of an external unidirectional source, not shown. The terminal 42 connects to a radio frequency (R. F.) choke 40, which prevents the circulation of radio-frequency currents from the oscillatory tank circuit to the high-voltage power supply. The choke 40 connects to a heat-radiating resistance element 38 which in turn is attached to a metallic mass 36 possessing a high thermal conductivity. The mass 36 may be of any shape or form convenient for mounting upon the thermistor element 34. It may be metallic, as described in this embodiment, a ceramic or any other material capable of acting as a good heat conductor; i. e., possessing a high thermal conductivity. Alternatively, a heat-conducting mass may be physically combined with a thermistor in a manner wherein the casing of the thermistor is composed of a thermally-conductive material such as a ceramic.

The mass 36 is mounted upon the thermistor element 34, which in turn mounts upon the plate-connected parallel rod inductor 32 near the plate end. The thermistor 34 is a thermally sensitive resistor possessing a large negative temperature coefficient of resistance. It may be commercially obtained in many shapes and sizes. The resistance element is usually a semi-conductor material employing a metallic oxide such as manganese, nickel, and cobalt. A complete discussion on such devices will be found in an article entitled "Properties and uses of thermistors—thermally sensitive resistors," J. A. Becker et al., beginning on page 711 of the November 1946 issue of Electrical Engineering Magazine. In the embodiment shown, the first resistance element 38 is electrically connected to the metallic mass 36 which connects thru the thermistor 34 to the plate electrode 18. The principal function of the mass 36 is to transmit heat to the thermistor 34; hence it is not essential that the resistor 38 be directly connected to the mass 36 and this resistor 38 may be directly connected to the thermistor 34, provided the mass 36 receives heat generated by the plate resistor 38.

The oscillator circuit shown is the equivalent of a Colpitts oscillator, the inter-electrode and stray capacitances associated with the electron discharge device 10 forming the capacitance divider network necessary in such as circuit. In a Colpitts circuit an exciting voltage of the appropriate phase is obtained by connecting the grid and plate electrodes to opposite ends of the tank circuit with respect to the cathode electrode, with the ratio of exciting voltage to alternating plate-cathode voltage being determined by the relative reactances on the two sides of the cathode connection; that is, by the values of the inter-electrode and stray capacitances forming the capacitance divider. A discussion of such oscillators may be found beginning at page 480, in "Radio Engineers' Handbook," by Terman, first edition, McGraw-Hill Book Co., Inc. In operation, the oscillator of Figure 1 will exhibit a negative frequency drift characteristic due to heat flow both within and without the electron discharge device 10.

In Figure 2, which illustrates the frequency drift versus time characteristics for an uncompensated oscillator, the curves are representative of those shown in "Frequency characteristics of local oscillators," September 1955, RCA Review, cit. supra, which presents a complete analysis of the frequency characteristics of oscillators under conditions of heat flow. A further study of this problem is found in "Minimizing local oscillator drift," by W. Y. Pan and D. J. Carlson, beginning at page 21, RCA Engineer, December 1956–January 1957, vol. 2, No. 4. It will be noted that there is an initial or short-time frequency drift of considerable magnitude, designated as curve (*a*) of Figure 2, relative to the initial frequency, designated $f_0$ on the graph. This portion corresponds to the heat-actuated changes within the tube which change the internal configuration and geometry, hence capacitance. The long-time or secondary drift, which is much smaller in magnitude and extends over a much longer period of time, is principally due to changes in external circuitry caused by both heat conducted from the tube and the temperature of the environment. This is designated as curve (*b*) of Figure 2. Curve (*c*) indicates the overall drift and is the sum of curves (*a*) and (*b*).

On the other hand it has been found that the operating frequency of such an oscillator, within limits, is dependent upon the value of the plate voltage for the vacuum tube. As indicated by Figure 3, which illustrates this characteristic, the frequency will increase as the plate voltage is increased. If the plate voltage can therefore be made to change in a manner opposite to the changes brought about by the heat-flow, complete frequency drift compensation may be achieved.

Figure 4 is a curve showing generally the negative temperature coefficient of resistance for a typical thermistor. This characteristic may be utilized to achieve complete frequency drift compensation for changes due to heat flow if the thermistor 34 of Figure 1 can be made to change its resistance initially in a manner following the short-time temperature increase and subsequently in accordance with the long-time temperature change.

In the arrangement shown in Figure 1, the thermistor 34 is serially connected in the circuit supplying potential to the plate 18 of the electron discharge device or vacuum tube 10. A current flow from the supply terminal 42 passes thru the first resistance 38, thence thru the metallic mass 36 and thermistor 34 to the plate electrode 18. Current flow thru the first resistor 38, which maintains substantially constant resistance over a wide range of temperatures, causes the radiation of heat energy to the metallic mass 36. The mass 36 heats rapidly, and being mounted in close proximity to the thermistor 34, the temperature of the latter element is raised accordingly. The rapid temperature rise causes a rapid decrease in resistance. The lessened resistance in the plate voltage supply circuit resulting thereby causes an increase in voltage to appear on the plate electrode 18, thereby shifting the frequency of the oscillator in a positive direction to compensate for the negative frequency drift caused by heat-produced electrode expansion within the tube.

The lower portion of the thermistor 34 being mounted on the plate-connected tank inductor 32, the long-time temperature of the circuit as reflected by the tank inductance 32 will further influence the resistance of the thermistor 34 in a manner comparable to the changes brought about by the long-time temperature rise of the associated portions of the oscillator circuit. The plate voltage will be raised an amount necessary to compensate for the long-time negative temperature coeffiicent of frequency of an otherwise uncompensated oscillator, and is adjusted by selecting the proper thermistor characteristic.

The instant invention is not limited to the physical arrangement shown but will be equally operative where an element possessing a negative temperature coefficient of resistance located in a plate voltage supply circuit is subjected to a heat source which is representative of the circuit short-time temperature characteristic, as well as another heat source representative of the long-time temperature characteristic.

While the subject invention is described in connection with an U. H. F. triode oscillator, it will be understood that it is equally operable with other types of oscillators possessing a negative temperature coefficient of frequency. Particular utility is found in radar applications utilizing electron discharge devices such as the voltage-tunable magnetron and the reflex-klystron which are quite frequency sensitive with respect to voltage variations. Additionally, the invention is not confined to oscillatory circuits, but is applicable to any tuned circuit associated with the operating circuit of a thermionic electron discharge device.

It is to be understood that the form of the invention, herewith shown and described, is to be taken as a preferred example of the same, and that various changes in the shape, size and arrangement of the parts may be resorted to, without departing from the spirit of the invention and of the scope of the subjoined claims.

What is claimed is:

1. A temperature compensated electron discharge device circuit comprising, an electron discharge device including a plate electrode, an oscillatory tank circuit connected to said plate electrode, a source of unidirectional current, a resistance element exhibiting a negative temperature coefficient of resistance serially connected between said source and said plate electrode, a heat source actuated by said source of unidirectional current and in thermal-coupling relation to said resistance element, said resistance element being responsive to heat generated by said heat source.

2. A temperature compensated electron discharge device circuit comprising, an electron discharge device including a plate electrode, an oscillatory tank circuit connected to said plate electrode, a source of unidirectional current, a resistance element exhibiting a negative temperature coefficient of resistance, a heat source in thermal-coupling relation to said resistance element, means connecting said resistance element and said heat source in series between said source of unidirectional current and said plate, said resistance element being responsive to heat generated by said heat source.

3. A temperature compensated electron discharge device circuit comprising, an electron discharge device including a plate electrode, an oscillatory tank circuit connected to said plate electrode, a source of unidirectional current, a resistance element exhibiting a negative temperature coefficient of resistance serially connected between said source and said plate electrode, a heat source actuated by said source of unidirectional current and in thermal-coupling relation to said resistance element, said resistance element being responsive to heat generated by said heat source, and a mass of material having high thermal conductivity abutting said resisance element and adapted to be heated by said heat source.

4. A temperature compensated electron discharge device circuit comprising, an electron discharge device including a plate electrode, an oscillatory tank circuit including an inductance, said inductance being connected to said plate electrode, said electron discharge device and said tank circuit together exhibiting a negative temperature coefficient of frequency, a source of unidirectional current, a first resistance element exhibiting a negative temperature coefficient of resistance, a heat producing second resistance element, means serially connecting said first and second resistance elements to said source of unidirectional current and a point intermediate the ends of said inductance of said oscillatory tank circuit, said first resistance element being mounted upon and abutting said inductance of said tank circuit, whereby said first resistance element is arranged to respond to heat transmitted by said second resistance and to ambient temperature variations transmitted by said inductance.

5. In an oscillation generator, a frequency compensating system comprising, a unidirectional source of current, a first resistance element exhibiting substantially constant resistance over a wide range of temperatures, a second resistance element exhibiting a negative temperature coefficient of resistance, said first resistance element electrically connecting said second resistance element to said current source, a mass of high thermal conductivity mounted in heat-transmitting relationship upon said second resistance, said mass arranged to receive heat radiated from said first resistance, an oscillatory tank circuit including an element at ambient temperature, said tank circuit being electrically connected to said second resistance element so that said second resistance element is mounted in heat-receiving relationship upon said tank circuit element.

6. In an oscillation generator, a circuit comprising, an electron discharge device including an input electrode and an output electrode, an oscillatory tank circuit including an inductance element, said tank circuit being connected between said input and output electrodes, a first resistance element exhibiting a negative temperature coefficient of resistance, said first resistance element being in electrical connection with said oscillatory tank circuit and thru said tank circuit with said output electrode, said first resistance element having one side mounted in heat-receiving relationship to said tank inductance element, a mass exhibiting a high thermal conductivity characteristic mounted in heat-transmitting relationship to another side of said first resistance element, a second resistance element in electrical connection with said first resistance element, said second resistance element being mounted in heat-transmitting relationship to said mass, a source of unidirectional current, said second resistance electrically connecting said current source to said oscillatory tank circuit thru said first resistance element.

7. A circuit as claimed in claim 6 wherein said mass is electrically connected between said first resistance element and said second resistance element.

8. In a frequency stabilized oscillator including an electron discharge device, an oscillatory tank circuit connected thereto and determining the frequency thereof, said electron discharge device and said tank circuit together exhibiting a negative temperature coefficient of frequency, and a source of unidirectional current: a positive temperature coefficient of frequency control circuit comprising, a first resistance element, a second resistance element, said first resistance element exhibiting a negative temperature coefficient of resistance, said second resistance element exhibiting a substantially constant resistance over a wide variation in temperature, said first and second resistance elements electrically connecting said source of unidirectional current to said electron discharge device and said tank circuit, a mass exhibiting a high thermal conductivity characteristic mounted in heat-receiving relationship to said second resistance element and in heat-transmitting relationship to said first resistance element, said first resistance element being mounted in heat-receiving relationship to said tank circuit.

9. A temperature-actuated electron discharge device voltage control circuit comprising, a current-actuated primary heat source, a secondary heat source at ambient temperature, a resistance element exhibiting a negative temperature coefficient of resistance, a mass exhibiting a high thermal conductivity, said mass being arranged in a heat-receiving relation with said primary heat source and a heat-transmitting relation with said resistance element, said resistance element being arranged in a heat-receiving relation with both said primary and said secondary heat sources, a second source of unidirectional potential, means for connecting said primary heat source and said resistance element in series between said second source and said electron discharge device.

10. In combination, an electron discharge device having a plurality of electrodes, a unidirectional power source, a connection from a terminal of said source to one of said electrodes, a thermistor, a rapidly-heating resistance element proximately arranged thereto, said resistance element and said thermistor in series in said connection, and means connecting said electrodes to a resonant circuit whereby oscillations are set up in said circuit, the frequency of said oscillations tending to drift as the temperatures of said electron discharge device electrodes and of the ambient surrounding said device and circuit change, the frequency of said oscillations changing in response to changes in the voltage applied to said one electrode, said thermistor being exposed to heat radiation from said proximately arranged resistance element and to the ambient temperature, thereby to vary the voltage applied to said one electrode in response to variations in said temperatures.

11. In combination, an electron discharge device having an anode electrode and other electrodes; a unidirectional power source, a connection from a terminal of said source to said anode electrode, a first resistance element exhibiting a zero temperature coefficient of resistance, a second resistance element exhibiting a negative temperature coefficient of resistance, said first resistance element being rapidly heating and being arranged in heat-transmitting relationship to said second resistance element, said first and second resistance elements in series in said connection, and means connecting said electrodes to a resonant circuit whereby oscillations are set up in said circuit, the frequency of said oscillations tending to drift as the temperatures of the electron discharge device electrodes and the ambient surrounding said device and circuit changes and the frequency of said oscillations changing in response to changes in the voltage applied to said anode electrode, said second resistance element being arranged to receive heat radiation from both said first resistance element and the ambient, thereby to vary the voltage applied to said anode electrode in response to variations in said temperature.

12. In an oscillation generator employing a parallel-tuned oscillatory circuit and wherein the operating voltage controls the generated frequency, a thermistor in series with the operating voltage, a heat-supplying element in circuit with said operating voltage for supplying heat to said thermistor, and means providing a second heat flow path for said thermistor by which heat may be removed from said oscillatory circuit and transferred to said thermistor by direct conduction thereto to supplement the heat produced by said element, said second heat flow path being mounted on said oscillatory circuit.

13. An oscillator circuit comprising, in combination, an electron discharging device having an input and output electrode, an oscillatory tank circuit connected between said input and output electrodes and including an inductance, a resistance device characterized by a negative temperature coefficient of resistance mounted adjacent said inductance so that said resistance device is responsive to heat emitted from said inductance, a current-actuated heat source, a mass of material having high thermal conductivity mounted upon said resistance device and arranged to vary the temperature of said resistance device according to the heat emitted by said heat source, a second source of unidirectional potential, means for connecting said heat source, said resistance device and said mass in series between said second source and a point intermediate the ends of said inductance, said resistance device causing the voltage applied from said source to said output electrode through said resistance device to vary according to the heat emitted from said heat source and from said inductance.

14. An oscillator circuit as claimed in claim 13 and wherein said heat source includes a second resistance device characterized by constant resistance over a wide range of temperatures.

References Cited in the file of this patent

UNITED STATES PATENTS

| | | |
|---|---|---|
| 1,455,767 | Slepian | May 15, 1923 |
| 1,778,827 | Evans | Oct. 21, 1930 |
| 2,111,086 | Basim | Mar. 15, 1938 |
| 2,717,313 | Pan | Sept. 6, 1955 |